US007564858B1

(12) United States Patent
Moncada-Elias et al.

(10) Patent No.: US 7,564,858 B1
(45) Date of Patent: Jul. 21, 2009

(54) SYSTEM AND METHOD FOR ENABLING A REMOTE INSTANCE OF A LOOP AVOIDANCE PROTOCOL

(75) Inventors: Jordi Moncada-Elias, Milpitas, CA (US); Rajiv Ramanathan, Cupertino, CA (US)

(73) Assignee: Foundry Networks, Inc., San Jose, CA (US)

( * ) Notice: Subject to any disclaimer, the term of this patent is extended or adjusted under 35 U.S.C. 154(b) by 911 days.

(21) Appl. No.: 10/632,635

(22) Filed: Aug. 1, 2003

(51) Int. Cl.
    *H04Q 12/28* (2006.01)
(52) U.S. Cl. ..................................... 370/402; 370/389
(58) Field of Classification Search ......... 370/400–402, 370/358, 351, 391, 392, 395.5, 389, 248, 370/256, 242, 258, 403, 404, 405, 236.1, 370/236.2, 386, 384, 426
    See application file for complete search history.

(56) References Cited

U.S. PATENT DOCUMENTS

| | | | | |
|---|---|---|---|---|
| 5,761,435 A * | 6/1998 | Fukuda et al. | ............... | 709/238 |
| 5,878,232 A | 3/1999 | Marimuthu | ............ | 395/200.79 |
| 5,959,968 A | 9/1999 | Chin et al. | | |
| 6,163,543 A | 12/2000 | Chin et al. | ................... | 370/400 |
| 6,202,114 B1 * | 3/2001 | Dutt et al. | ................... | 710/311 |
| 6,304,575 B1 * | 10/2001 | Carroll et al. | ............... | 370/408 |
| 6,628,624 B1 | 9/2003 | Mahajan et al. | ............. | 370/256 |
| 6,628,661 B1 | 9/2003 | Goldman et al. | | |
| 6,697,339 B1 | 2/2004 | Jain | ........................... | 370/256 |
| 6,717,922 B2 * | 4/2004 | Hsu et al. | ................... | 370/258 |
| 6,766,482 B1 | 7/2004 | Yip et al. | | |
| 6,795,403 B1 | 9/2004 | Gundavelli | | |
| 6,937,576 B1 | 8/2005 | Di Benedetto et al. | ...... | 370/256 |
| 6,985,449 B2 | 1/2006 | Higashiyama | .............. | 370/256 |
| 7,003,705 B1 | 2/2006 | Yip et al. | .................... | 714/717 |
| 7,126,923 B1 | 10/2006 | Yang et al. | | |
| 7,154,861 B1 | 12/2006 | Merchant et al. | ............ | 370/254 |
| 7,209,435 B1 | 4/2007 | Kuo et al. | | |
| 7,286,491 B1 | 10/2007 | Smith | | |
| 2002/0154606 A1 | 10/2002 | Duncan et al. | .............. | 370/256 |
| 2002/0181413 A1 | 12/2002 | Kitagawa | | |

(Continued)

OTHER PUBLICATIONS

Norman Finn, Spanning the World with Ethernet, Powerpoint Presentation, publication date unknown, 132 pages.

(Continued)

*Primary Examiner*—Brenda Pham
(74) *Attorney, Agent, or Firm*—Nixon Peabody LLP; John P. Schaub

(57) ABSTRACT

A system and method which enables a provider network to run a loop detection protocol in a customer network communicably coupled to it. The provider network runs a loop detection protocol and the customer network either runs a different protocol or none. The provider network determines its root bridge, or designated customer bridge, which is used to control loop detection decisions for the customer network. A BPDU or other protocol packet received from the customer network is tunneled through the provider network to the designated customer bridge. The designated customer network then processes the received BPDU in accordance with a loop detection instance for the customer network. The designated customer bridge then produces control messages in response to the processing and forwards those messages to the customer network. The control messages may include port state controls for ports in the customer network.

32 Claims, 10 Drawing Sheets

U.S. PATENT DOCUMENTS

| | | | |
|---|---|---|---|
| 2003/0142680 A1* | 7/2003 | Oguchi | 370/400 |
| 2003/0169694 A1 | 9/2003 | Seaman | |
| 2003/0223379 A1 | 12/2003 | Yang et al. | |
| 2004/0081171 A1 | 4/2004 | Finn | 370/395.53 |
| 2004/0255050 A1 | 12/2004 | Takehiro et al. | 709/252 |
| 2005/0013260 A1 | 1/2005 | Ramanathan et al. | |
| 2005/0259597 A1 | 11/2005 | Di Benedetto et al. | 370/254 |
| 2006/0206656 A1 | 9/2006 | Di Benedetto et al. | 710/316 |
| 2006/0233186 A1 | 10/2006 | Portolani et al. | 370/408 |

OTHER PUBLICATIONS

Joseph A. Cobb, Convergent Multi-Path Routing, Whitepaper, 2000, 10 pages, International Conference on Network Protocols.

Ahmed Abdelhalim, IP/MPLS-Based VPS's Layer-3 vs. Layer-2, Whitepaper, Mar. 22, 2002, 16 pages.

ANS/IEEE Std 802.1D, 1998 Edition, Part 3: Media Access Control (MAC) Bridges, Adopted by the ISO/IEC and redesignated as ISO/IEC 15802-3:1998, Sponsor LAN/MAN Standards Committee of the IEEE Computer Society, pp. 58-109.

U.S. Appl. No. 10/632,591, filed Aug. 1, 2003.

U.S. Appl. No. 11/246,945, Office Action dated Jun. 30, 2008.

U.S. Appl. No. 10/456,756, filed Jun. 9, 2003.

* cited by examiner

Prior Art

SYSTEM AND METHOD FOR ENABLING A REMOTE INSTANCE OF A LOOP AVOIDANCE PROTOCOL

FIELD OF THE INVENTION

The invention relates to network configuration protocols, and, more particularly, to protocols which enable loop avoidance to be remotely run on a network not running a loop avoidance protocol.

BACKGROUND OF THE INVENTION

A computer network typically comprises a plurality of interconnected devices. These devices may include any network device, such as a server or end station, that transmits or receives data frames. A common type of computer network is a local area network ("LAN") which typically refers to a privately owned network within a single building or campus. LANs may employ a data communication protocol, such as Ethernet or token ring, that defines the functions performed by the data link and physical layers of a communications architecture in the LAN. In many instances, several LANs are interconnected by point-to-point links, microwave transceivers, satellite hookups, etc. to form a wide area network ("WAN") that may span an entire country or continent.

One or more intermediate network devices are often used to couple LANs together and allow the corresponding entities to exchange information. For example, a bridge may be used to provide a bridging function between two or more LANs. Alternatively, a switch may be utilized to provide a switching function for transferring information among a plurality of LANs or end stations. In effect, a switch is a bridge among more than two networks or entities. The terms "bridge" and "switch" will be used interchangeably throughout this description. Bridges and switches are typically devices that operate at the Data Link layer ("layer 2") of the Open Systems Interconnection ("OSI") model. Their operation is defined in the American National Standards Institute ("ANSI") Institute of Electrical and Electronics Engineers ("IEEE") 802.1D standard. A copy of the ANSI/IEEE Standard 802.1D, 1998 Edition, is incorporated by reference herein in its entirety.

Telecommunication traffic among network devices is divided into seven layers under the OSI model and the layers themselves split into two groups. The upper four layers are used whenever a message passes to or from a user. The lower three layers are used when any message passes through the host computer, whereas messages intended for the receiving computer pass to the upper four layers. "Layer 2" refers to the data-link layer, which provides synchronization for the physical level and furnishes transmission protocol knowledge and management.

Networks may be designed using a plurality of distinct topologies—that is, the entities in the network may be coupled together in many different ways. Referring to FIGS. 1-3, there are shown different examples of "ring" topologies. A ring topology is a network configuration formed when "Layer 2" bridges are placed in a circular fashion, with each bridge having two and only two ports belonging to a specific ring. FIG. 1 shows a single ring 150 having bridges 152 connected by paths 154. Each bridge 152 in ring 150 in FIG. 1 has two ports 152a and 152b belonging to the ring. FIG. 2 shows two adjacent rings, 150a and 150b, with a single bridge 156 having two ports 156a, 156b belonging to each ring.

In FIGS. 1 and 2, no paths or bridges are shared among rings. In FIG. 3 two rings 150c and 150d are connected and share two bridges 158, 160. Bridge 158 has two ports 158a and 158b which each uniquely belong to only one ring, rings 150c and 150d respectively. Bridge 158 also has one port 158c connected to a path which is shared by both rings 150c and 150d. If rings are assigned different priority levels, a port such as 158c connected to the shared link assumes the priority value of the higher priority ring, and ports 158a and 158b in shared bridge 158 and port 160a in bridge 160 connected to the lower priority ring are deemed to be customer (or lower priority) ports. The use of a shared link between shared bridges 158, 160 allows for the connection of rings and the growth of a larger network from smaller ring components; however, the shared link also presents difficulties since its failure affects both rings 150c and 150d.

Ring topologies shown in FIGS. 1-3 present Layer 2 traffic looping problems. As illustrated in FIG. 4, in a single ring topology, data traffic can circulate around in either direction past their origination and thus create repetition of messages. For example, data traffic may originate in bridge 151, travel counter-clockwise in the ring, pass bridge 157 and return to bridge 151. This is called a loop. Loops are highly undesirable because data frames may traverse the loops indefinitely. Furthermore, because switches and bridges replicate, e.g. flood, frames whose destination port is unknown or which are directed to broadcast or multicast addresses, the existence of loops may cause a proliferation of data frames that effectively overwhelms the network.

To prevent looping, one of the paths in the ring is blocked, as shown in FIG. 4, by blocking data traffic in one of the ring ports—in this case, either port 151a or 157a. The port is deemed to be in a "blocking" state, in which it does not learn or forward incoming or outgoing traffic.

A network may be segregated into a series of logical network segments. For example, any number of physical ports of a particular switch may be associated with any number of other ports by using a virtual local area network ("VLAN") arrangement that virtually associates the ports with a particular VLAN designation. Multiple ports may thus form a VLAN even though other ports may be physically disposed between these ports.

The VLAN designation for each local port is stored in a memory portion of the switch such that every time a message is received by the switch on a local port the VLAN designation of that port is associated with the message. Association is accomplished by a flow processing element which looks up the VLAN designation in the memory portion based on the local port where the message originated.

Most networks include redundant communications paths so that a failure of any given link or device does not isolate any portion of the network. For example, in the ring networks shown in FIGS. 1-4, if communication is blocked preventing data from flowing counter-clockwise, the data may still reach its destination by moving counter-clockwise. The existence of redundant links, however, may also cause the formation of loops within the network.

To avoid the formation of loops, many network devices execute a "spanning tree algorithm" that allows the network devices to calculate an active network topology which is loop-free (e.g. has a needed number of ports blocked) and yet connects every element in every VLAN within the network. The IEEE 802.1D standard defines a spanning tree protocol ("STP") to be executed by 802.1D compatible devices (e.g., bridges, switches, and so forth). In the STP, Bridge Protocol Data Units ("BPDUs") are sent around the network and are used to calculate the loop free network technology.

The spanning tree protocol, defined in IEEE 802.1, is used by bridges in a network to dynamically discover a subset of the network topology that provides path redundancy while preventing loops. Spanning tree protocol provides redundancy by defining a single tree that spans the bridges and maintains all other paths and connections in a standby or blocked state. The protocol allows bridges to transmit messages to one another to thereby allow each bridge to select its place in the tree and which states should be applied to each of its ports to maintain that place. For example, a port in a given bridge that is connected to an active path at a given time is kept in a forwarding state in which all data traffic is received and transmitted to the next portion of the network; ports in the bridge that are connected to inactive paths are kept in a non-forwarding state, such as a blocking state, in which traffic is blocked through that port.

Bridges in a spanning tree network pass bridge protocol data units, or "BPDU"s, amongst themselves. Each BDPU comprises information including root, bridge and port identifiers, and path cost data (all discussed below). This information is used by the bridges, to "elect" one of the bridges in the spanning tree network to be a unique "root bridge" for the network, calculate the shortest least cost path, e.g. distance, from each bridge to the root bridge, select which ports will be blocking, and for each LAN, elect one of the bridges residing in the LAN to be a "designated bridge".

In brief, the election of a root bridge is performed by each bridge initially assuming itself to be the root bridge. Each bridge transmits "root" BPDUs and compares its BDPU information with that received from other bridges. A particular bridge then decides whether to stop serving as a root and stop transmitting BPDUs when the configuration of another bridge is more advantageous to serve as the root than the particular bridge. Ports are converted from blocking to forwarding states and back again and undergo several possible transition states depending upon the BPDUs received. Once the bridges have all reached their decisions, the network stabilizes or converges, thereby becoming loop-free. A similar process is followed after a link failure occurs in the network. In that case, a new root and/or new active paths must be identified. An overview of the spanning tree protocol, which is well known to those of skill in the art, can be found at http://standards.ieee.org/getieee802/download/802.1D-1998.pdf, pages 58-109 and is herein incorporated by reference in its entirety.

Other available loop avoidance protocols include that shown and described in now pending NETWORK CONFIGURATION PROTOCOL AND METHOD FOR RAPID TRAFFIC RECOVERY AND LOOP AVOIDANCE IN RING TOPOLOGIES, filed Mar. 4, 2002, Ser. No. 10/090,669, now U.S. Pat. No. 6,717,922, issued Apr. 6, 2004, and now pending SYSTEM AND METHOD FOR PROVIDING NETWORK ROUTE REDUNDANCY ACROSS LAYER 2 DEVICES, filed Apr. 16, 2002, Ser. No. 10/124,449. The entirety of these applications is hereby incorporated by reference.

All of the current protocols require devices in a network to be protocol-aware. That is, each device must be able to run and understand the protocol that is globally running in the network. A misconfigured protocol or malfunctioning device could potentially cause a loop that would impact the whole network.

To illustrate this problem, referring to FIG. 5, there is shown a network 180 comprising a core or higher priority network such as a provider 170 coupled to a customer or lower priority network 172 with a lower priority through a switch 174. Core network 170 runs a conventional spanning tree protocol to avoid loops and has defined a blocked path 176. This means that either port 178 or port 180 is blocked. Many different causes may result in involuntary loops which may collapse the entire network 180 including: STP corrupted BPDUs, unidirectional optical fibers which result, for example, when paths which typically comprise two optical fibers have one optical fiber shut down, and non-configured protocols in loop topologies. In the example in FIG. 5, someone in customer network 172 has improperly disabled the STP running in network 172 or, the STP has become disabled due to problems just mentioned. As a consequence, even though core network 170 is properly running the STP to avoid loops, since the customer in network 172 is not running the STP, a loop is created in customer network 172 and packets from customer network 172 flood core network 170. As core network 170 and customer network 172 share the same data domain, core network 170 will be flooded with customer packets and will be affected adversely by the customer's action. Yet, it is not possible to ensure that all network administrators or devices are properly doing their respective jobs and running respective STPs. Provider networks may form the core network for entire countries or even continents. These provider networks should not be affected by fluctuations in customer networks.

In the application NETWORK CONFIGURATION PROTOCOL AND METHOD FOR RAPID TRAFFIC RECOVERY AND LOOP AVOIDANCE IN RING TOPOLOGIES (referenced above), a network configuration protocol allows for de-coupling of customer networks and provider networks running distinct instances of a STP. In brief, in a large ring network comprising first and second rings connected through the shared use of a bridge, the first and second rings are assigned a lower relative priority, e.g. a customer, and a higher relative priority, e.g. a provider. Control packets for the lower priority ring are sent through the entire large ring. Control packets for the higher priority ring are sent only through the higher priority ring. In the event that the shared bridge fails, the lower priority ring maintains its status as its control packets continue to circulate the large ring. The higher priority ring detects the failure and adjusts ports accordingly.

However, if the lower priority network does not run some form of loop prevention/avoidance protocol to detect loops, loops will occur and will affect the provider network.

A method for resolving this issue is shown in U.S. patent application Ser. No. 10/456,756, entitled "System and Method for Multiple Spanning Tree Protocol Domains in a Virtual Local Area Network" by Rajiv Ramanathan and Jordi Moncada-Elias filed Jun. 9, 2003, the entirety of which is hereby incorporated by reference. In that application, multiple loop detection protocols are provided for each VLAN. This prevents "layer 2" loops by running a customer side spanning tree protocol from a provider network.

However, there is a need in the art for a system and method to protect a provider network when a customer network attached to it does not run a loop avoidance protocol even when the customer network is connected across multiple domains.

SUMMARY OF THE INVENTION

A system and method which enables a provider network to run a loop detection protocol in a customer network communicably coupled to it. The provider network runs a loop detection protocol and the customer network either runs a different protocol or none. The provider network determines its root bridge, or designated customer bridge, which is used to control loop detection decisions for the customer network. A BPDU or other protocol packet received from the customer network is tunneled through the provider network to the designated customer bridge. The designated customer network then processes the received BPDU in accordance with a loop detection instance for the customer network. The designated customer bridge then produces control messages in response to the processing and forwards those messages to the customer network. The control messages may include port state controls for ports in the customer network.

One aspect of the invention is a method for enabling a first network to control a loop avoidance protocol in a second network. The first network is running a first loop avoidance protocol instance. The second network is not running the first loop avoidance protocol instance. The first and second network are communicably coupled. The method comprises receiving a protocol packet from the second network at a first switch. The method further comprises forwarding the protocol packet to a second switch in the first network. The method further comprises processing the protocol packet at the second switch according to a loop avoidance protocol corresponding to the second network; and transmitting a message controlling the port state of a third switch based on the processing.

In accordance with another aspect of the invention, a system comprises a first network running a first loop avoidance protocol instance. A first switch is in the first network. A second network is not running the first loop avoidance protocol instance. The first network is communicably coupled to the second network. The first network receives a protocol packet from the second network. The first network forwards the protocol packet to the first switch. The first switch processes the protocol packet according to a loop avoidance protocol corresponding to the second network. The first switch transmits a message controlling the port state of a second switch in response to the processing.

In accordance with yet another aspect of the invention, a first network runs a loop avoidance protocol wherein the root bridge for the first network is disposed in a second network running a distinct loop avoidance protocol instance.

In accordance with still yet another aspect of the invention, a system comprises a first network including a plurality of switches. A second network also includes a plurality of switches. The first and second network are connected by at least a shared switch, the shared switch including a plurality of switches. The first and second network are connected by at least a shared switch, the shared switch including a plurality of ports including a second network port connected to the second network. The first network runs a first loop avoidance protocol instance. The second network does not run the first loop avoidance protocol instance. One of the bridges in the second network controls the state of the second network port.

In accordance with another aspect of the invention, a computer readable storage medium includes computer executable code for enabling a first network to control a loop avoidance protocol in a second network. The first network runs a first loop avoidance protocol instance. The second network does not run the first loop avoidance protocol instance. The first and second networks share at least one switch. The code performs the steps of receiving a protocol packet at a first switch. The code further forwards the protocol packet to a second switch in the first network. The code further processes the protocol packet according to a loop avoidance protocol corresponding to the second network; and transmits a message controlling the port state of a third switch based on the processing.

DETAILED DESCRIPTION OF THE PREFERRED EMBODIMENTS

Figure 6:
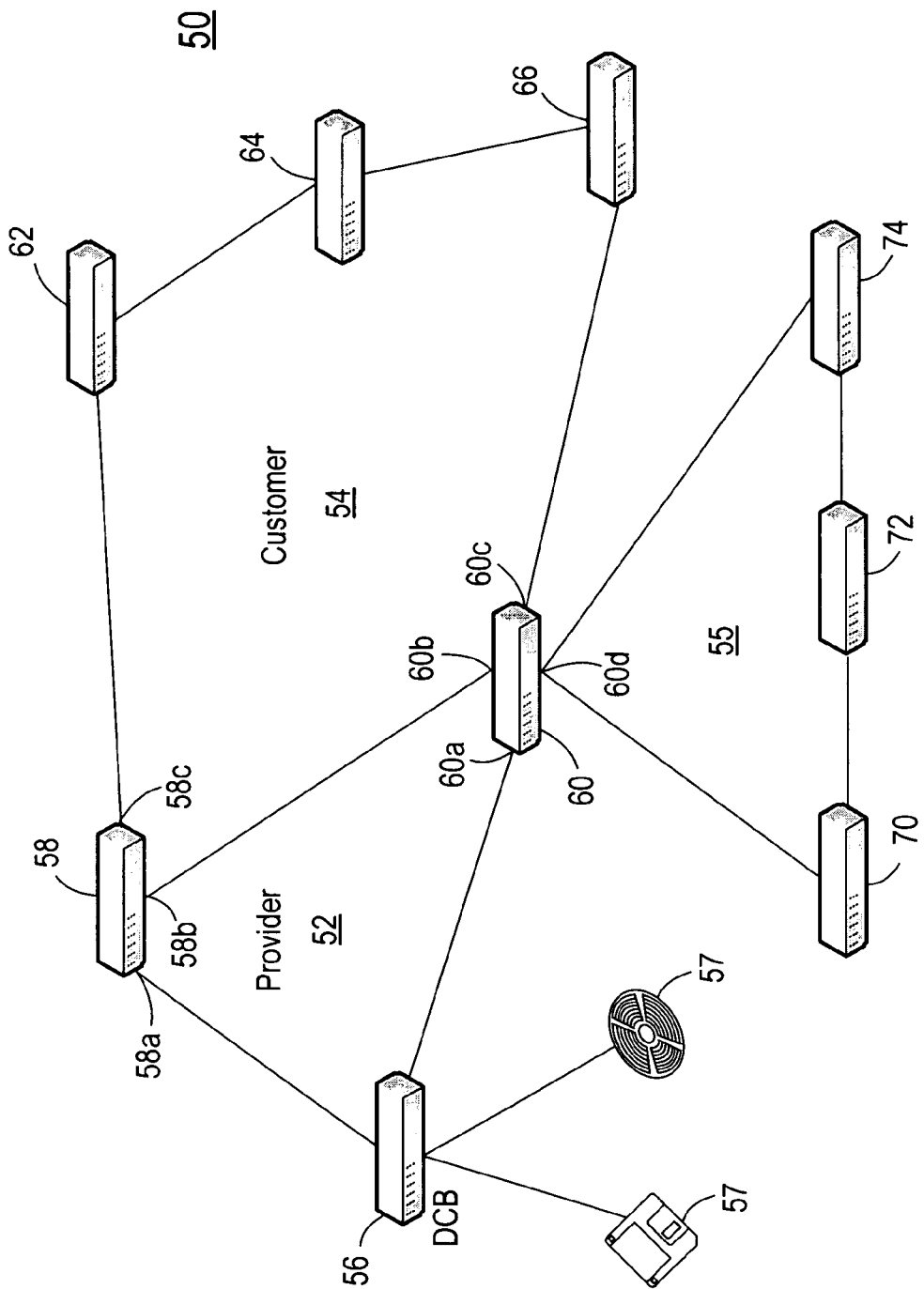
FIG. 6 is a network diagram detailing some of the features of one embodiment of the invention.

Referring now to FIG. 6, there is shown a network 50 operating in accordance with the embodiments of the invention. Network 50 is comprised of a core or provider network 52 communicably coupled to a customer network 54 and a customer network 55. Although provider network 52 is shown directly coupled to customer network 54, clearly networks 52, 54 may be indirectly coupled through other intervening networks.

Provider network 52 runs a first instance of STP or other loop detection or avoidance protocol and customer networks 54 and 55 either run a different instance or no instance. Provider network 52 includes switches 56, 58 and 60. Customer network 54 includes switches 62, 64, 66 and switches 58 and 60. Customer network 55 includes switches 70, 72, 74 and 60. Customer network 54 and provider network 52 are connected to each other through the shared use of switches 58 and 60. Switch 58 includes three ports 58*a*, 58*b* and 58*c*. Port 58*a* is connected to switch 56. Port 58*b* is connected to switch 60. Port 58*c* is connected to switch 62 of customer network 54. Similarly, switch 60 includes ports 60*a*, 60*b* and 60*c*. Port 60*a* is connected to switch 56. Port 60*b* is connected to switch 58. Port 60*c* is connected to switch 66 of customer network 54. Switch 60 also includes a fourth port 60*d* connected to switches 70 and 74 of network 55.

Provider network 52 runs an instance of STP or other protocol. As a consequence of the STP, a root bridge is chosen. In accordance with the invention, the root bridge is also called a designated customer bridge ("DCB"). In FIG. 6, switch 56 is the DCB. The root bridge for a specific VLAN is therefore the same as the DCB for that VLAN. The DCB may be configurable. In order to ensure loop detection in customer network 54, DCB 56 acts as a root bridge for customer network 54 and makes STP decisions for all customer ports associated with a LAN or VLAN as discussed below.

As any switch in provider network 52 may end up serving as the DCB, all switches include software 57 for operating the invention. The software may be stored on a recording medium at each bridge or accessed remotely. This software includes a look up table or other structure listing customer IDs for customer switches in customer network 54 connected to provider network 52 and corresponding STP or other loop detection instances.

Figure 1:
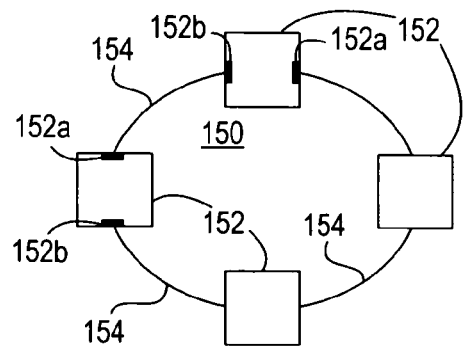
FIGS. 1-5 are network diagrams showing topologies of the prior art.
Figure 2:
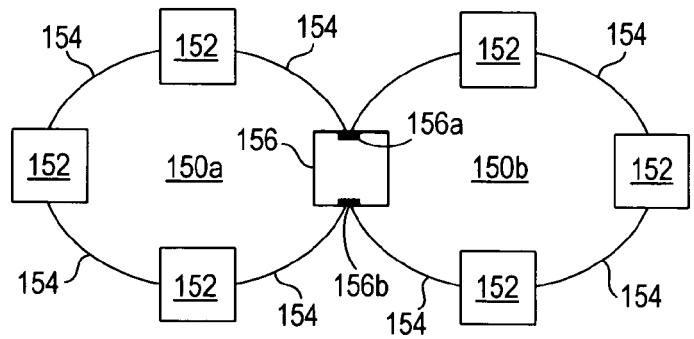
Figure 3:
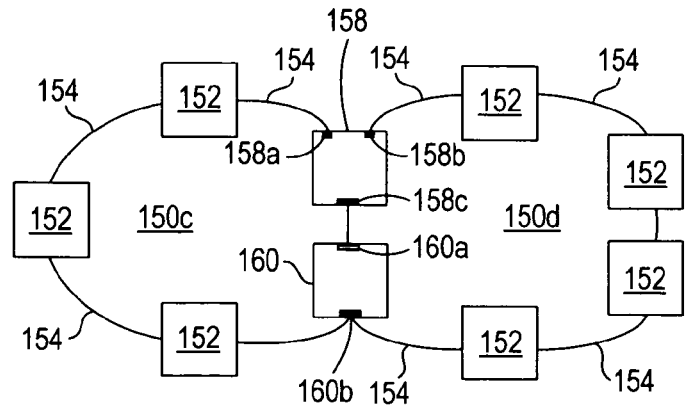
Figure 4:
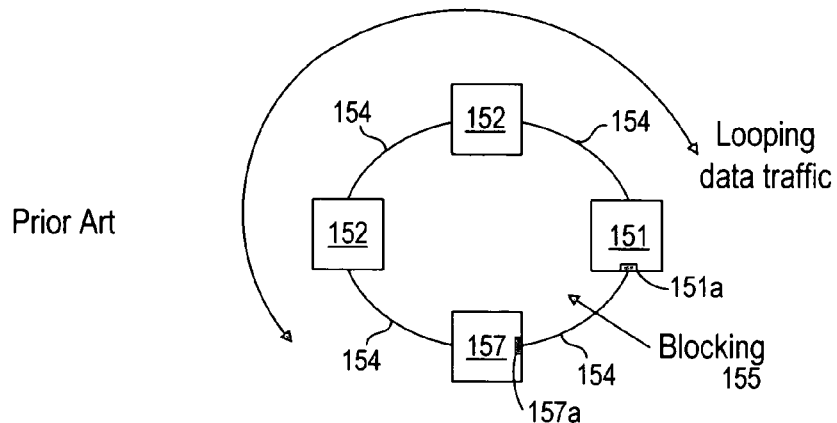
Figure 5:
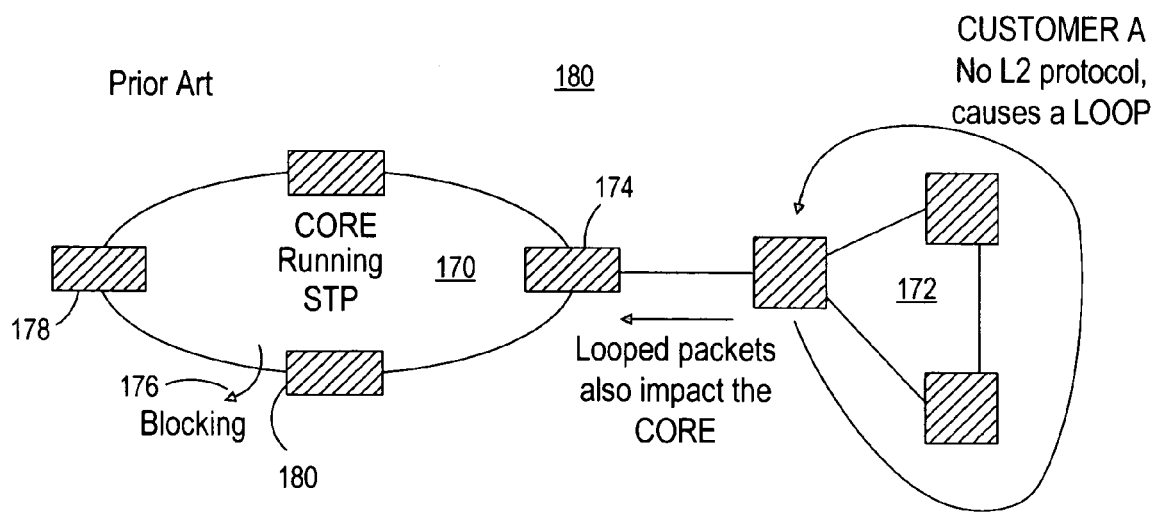
Figure 7:
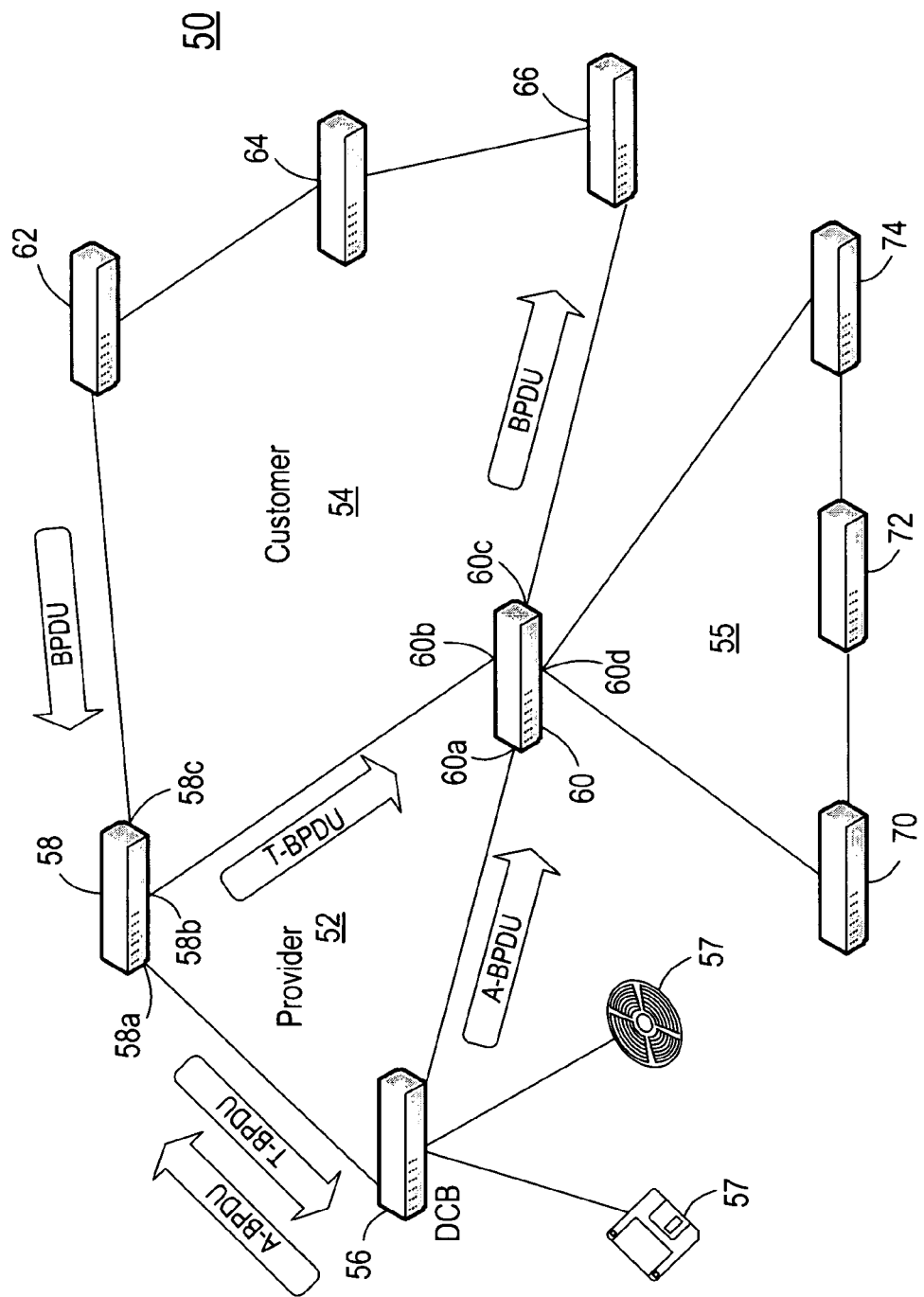
FIG. 7 is a network diagram detailing some of the features of one embodiment of the invention.

Referring to FIG. 7, and focusing specifically now on the interaction between customer network 54 and provider network 52, a customer port in provider network 52 is a port coupled to customer network 54 (e.g. ports 58c and 60c—in FIG. 2., 58c is used). The invention will be described using the STP for illustrative purposes. Clearly other protocols could be used. In accordance with the invention, when a standard IEEE BPDU or other protocol packet (hereinafter both referred to as "IEEE BPDU" or "BPDU") is received on customer port 58c it is forwarded to the DCB associated with the VLAN referenced in the BDPU. In order to differentiate this customer originated BPDU from BPDUs produced by switches in provider network 52, the customer BPDU is appended with an additional payload and tunneled through provider network 52 using a different destination address. This customer BPDU is called, for the purposes of this description, a "tunneled BPDU" or "T-BPDU". The tunneling process effectively means that the T-BPDU is forwarded throughout provider network 52 but none of the switches actually process the BPDU or strip its payload except for the switch corresponding to the destination address—in this case, the DCB.

The destination address for the new T-BPDU is changed to 03-80-c2-<cid>-00. The <cid> field is 2 bytes and carriers the customer identifier of the switch in customer network 54 that sent the BPDU. Additionally, the T-BPDU includes information appended to the conventional BPDU so that the DCB may identify the origin of the T-BPDU. This appended information is added to the standard IEEE 801.1D format for a BPDU, or other protocol format if STP is not used, and includes the BPDU type, e.g. tunneled or administrative—discussed below, the base MAC address of the bridge which received the customer BPDU, and the receiving port number of the port which received the customer BPDU (in the example, port 58c).

The T-BPDUs are tunneled through provider network 52 until they reach DCB 56. DCB 56 receives each T-BPDU and processes it in accordance with the loop detection protocol associated with the customer ID in the T-BPDU.

In response to this processing of the T-BPDU, the DCB is able to affect the states of ports in other switches in provider network 52. When the STP or other loop detection program run on the DCB determines to set a port state or transmit a BPDU, a special BPDU is used and transmitted to the applicable switch or port. The special BPDU for the purposes of this description is called an "Admin-BPDU" or "A-BPDU".

Figure 8:
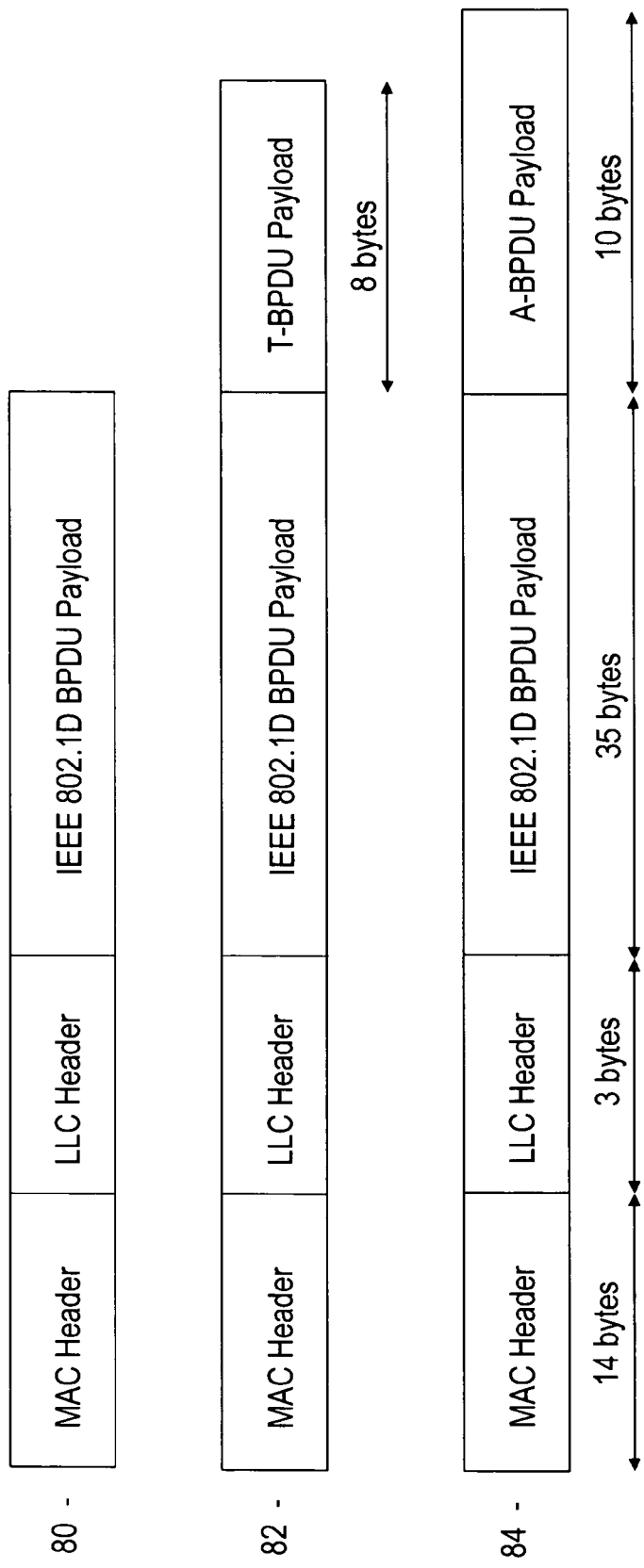
FIG. 8 is a diagram showing the contents of a standard IEEE BPDU and a T-BPDU in accordance with the invention and an A-BPDU in accordance with one embodiment of the invention.

Referring now also to FIG. 8, there are shown the different formats for a standard IEEE BPDU 80, a T-BPDU 82, and an A-BPDU 84. Standard BPDU 80 follows the IEEE 802.1D standard and is used between customer switches in customer network 54 and provider switches in provider network 52. BPDU 80 is also used between provider switches in provider network 52.

For T-BPDU 82, the destination address is modified to 03-80-c2-<cid>-00. A T-BPDU payload is appended and includes the following information: <type:4bits>:<portid of the receiving port:12bits>:<base MAC address of the receiving switch:6 bytes>. This is a total of 8 bytes. The Type field for a tunneled BPDU is set to "1".

A-BPDU 84 are sent among provider network switches. The destination address is 03-80-c2-<cid>-00—just like the T-BPDU except that the payload is different. The payload is <type:4bits>:<portID where the A-BPDU is destined: 12bits>:<base MAC address of the switch where the A-BPDU is destined: 6 bytes>:<port_state:4bits>: <VLAN_ID:12bits>. This is a total of 10 bytes.

The type field is encoded as follows: A value of 2 is assigned when the Admin_Transmit flag is active. This occurs when the DCB transmits BPDUs from provider network 52 through customer network 54. A value of 3 is assigned to the type field when the Admin_Set_State flag is active. This occurs when the DCB is going to set the state of a port in another switch. Unless the port state is set to blocking, a value of 3 in the type field also includes the Admin_Transmit BPDU discussed above.

The port state field is encoded as follows: 0-disabled, 1-blocking, 2-listening, 3-learning, 4-forwarding, 5-16-reserved state values.

The following explains the operation of the respective switches in provider network 52 when each type of switch receives a BPDU. Switch 56 is the DCB and switches 58 and 60 are non-DCBs. Customer ports are the ports in bridges of provider network 52 that receive information from customer network 54 (e.g. ports 58c and 60c).

BPDU Processing on Non-Designated Customer Bridges ("Non-DCB")

The following discusses processing of BPDUs received in switches 58 and 60.

If a standard IEEE 802.1D BPDU is received on a customer port (e.g. ports 58c, 60c), the BPDU was received from customer network 54 and so the destination address is modified as discussed above to produce a T-BPDU. The T-BPDU payload is appended to the end of the BPDU and the resulting T-BPDU is multicast across the applicable VLAN except to other customer ports. If the TC ("topology change") bit is set on the received BPDU, the port is set to fast-aging (all MAC addresses are dumped after a preset time—usually 15 seconds) so that a new topology can be achieved quickly.

If a standard IEEE 801.1D BPDU is received on a non-customer port of a non-DCB in provider network 52, e.g. ports 58a, 58b, 60a, and 60b, the BPDU was generated by a switch in provider network 52 and is processed by a standard provider spanning tree protocol, or other provider loop detection program as in the prior art.

If a T-BPDU is received by a non-DCB, the T-BPDU is flooded across the VLAN to all ports except customer ports. The T-BPDU is destined for the DCB.

If an A-BPDU is received by a non-DCB, the sender of the A-BPDU is matched with the current provider root (DCB). If the A-BPDU did originate from the DCB, the system determines whether the MAC addresses in the A-BPDU payload corresponds to the switch which received the A-BPDU. If they match, the payload of the A-BPDU is stripped. If the type field of the A-BPDU is Admin_Set_State, the state is set on the port listed in the A-BPDU payload. If the type field of the A-BPDU is Admin_Transmit, the destination address of the BPDU is modified to 01-80-c2-00-00-00 and transmitted into customer network 54 and to the customer port defined in the A-BPDU payload. This modification of the destination address causes the A-BPDU to be a standard BPDU that is now sent to customer network 54. These standard BPDUs are flooded through the customer network, interact with the customer protocols instances, and return to the provider network.

If the TC flag is set on the BPDU, the port is set to fast-aging.

BPDU Processing on a Designated Customer Bridge ("DCB")

The following discusses processing of BPDUs in DCB switch 56.

If a standard IEEE 802.1D BPDU is received on a non-customer port of switch 56, the BPDU originated from a switch in provider network 52 and is processed by the provider spanning tree protocol instance.

If a standard IEEE 802.1D BPDU is received on a customer port (for example if switch 56 had a port coupled to a customer network) the BPDU is processed by the customer spanning tree protocol instance. Such instance is known by the DCB because of the look-up table referenced above which lists customer IDs and corresponding loop detection instances.

If a T-BPDU is received on a port of switch 56, the T-BPDU is processed by the appropriate customer spanning tree instance in switch 56. This information is provided by the customer ID in the T-BPDU.

If a T-BPDU is received on a customer port of switch 56 in customer network 54, an error has occurred and the T-BPDU should be flagged.

If an A-BPDU is received on DCB 56, whether on a customer port or on a port connected to provider network 52, an error has occurred and the A-BPDU should be flagged.

Figure 9:
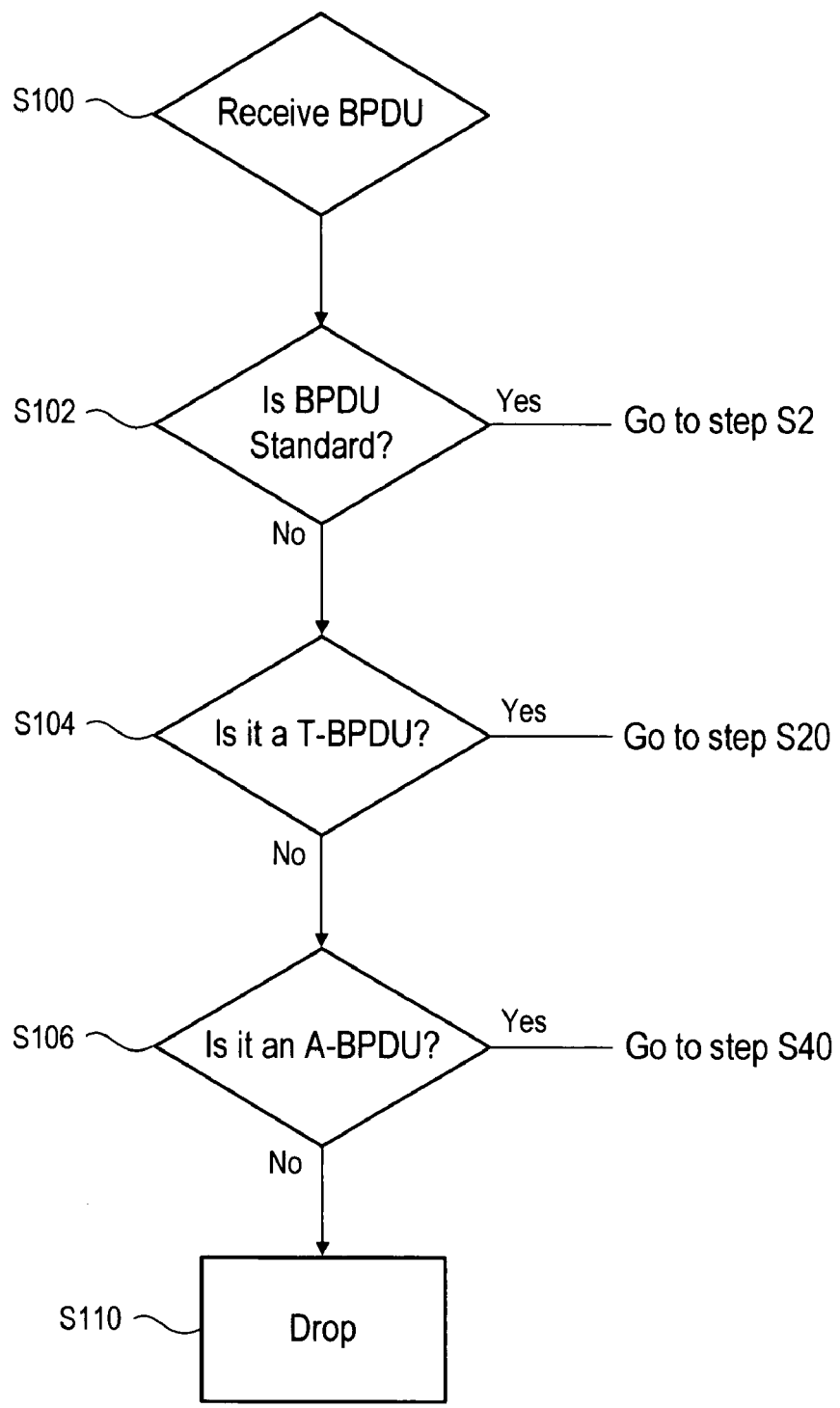
FIG. 9 is a flow chart detailing the operations of a switch in a provider network when it receives a BPDU in accordance with one embodiment of the invention.
Figure 10:
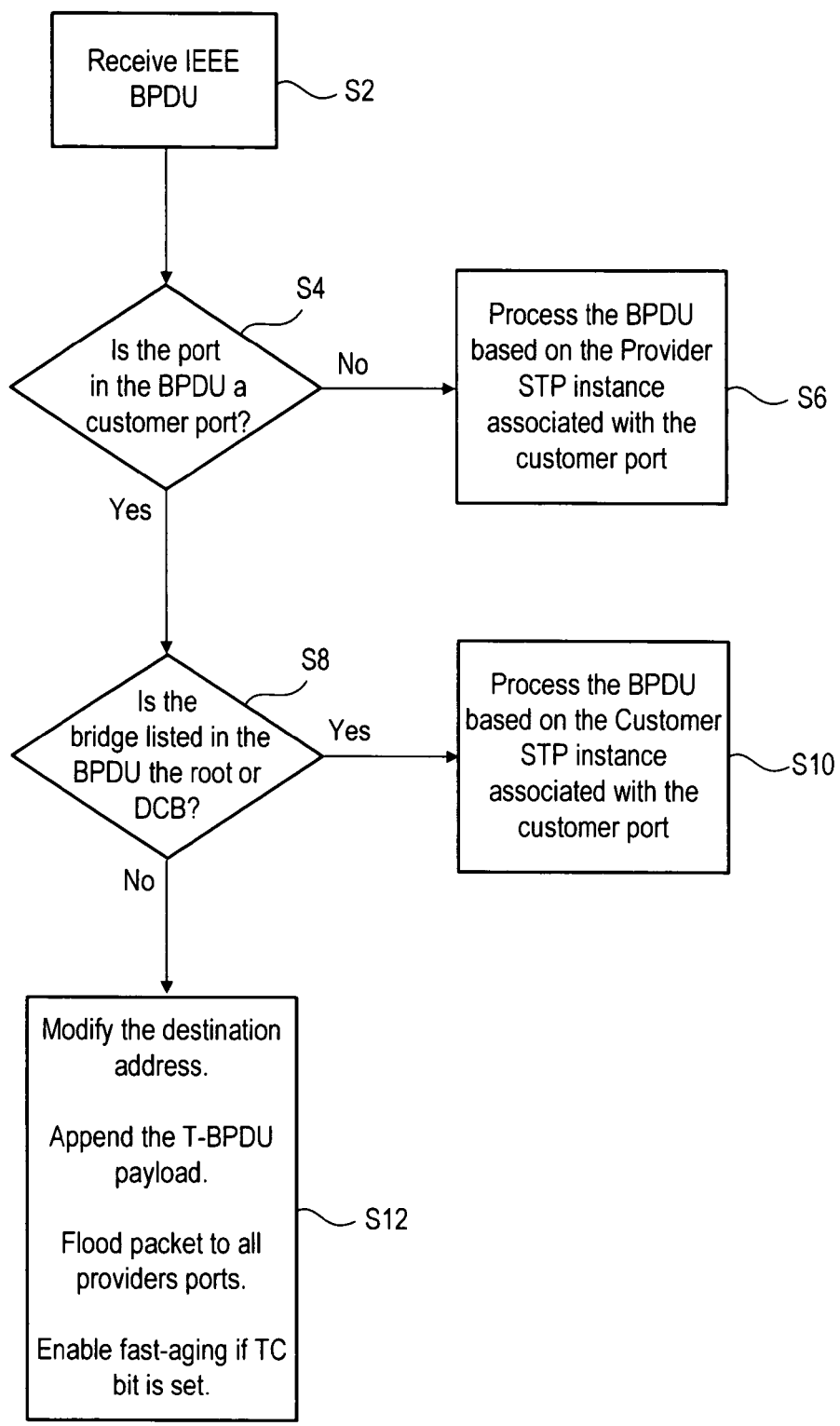
FIG. 10 is a flow chart detailing some of the features of the invention when a standard IEEE BPDU is received.
Figure 11:
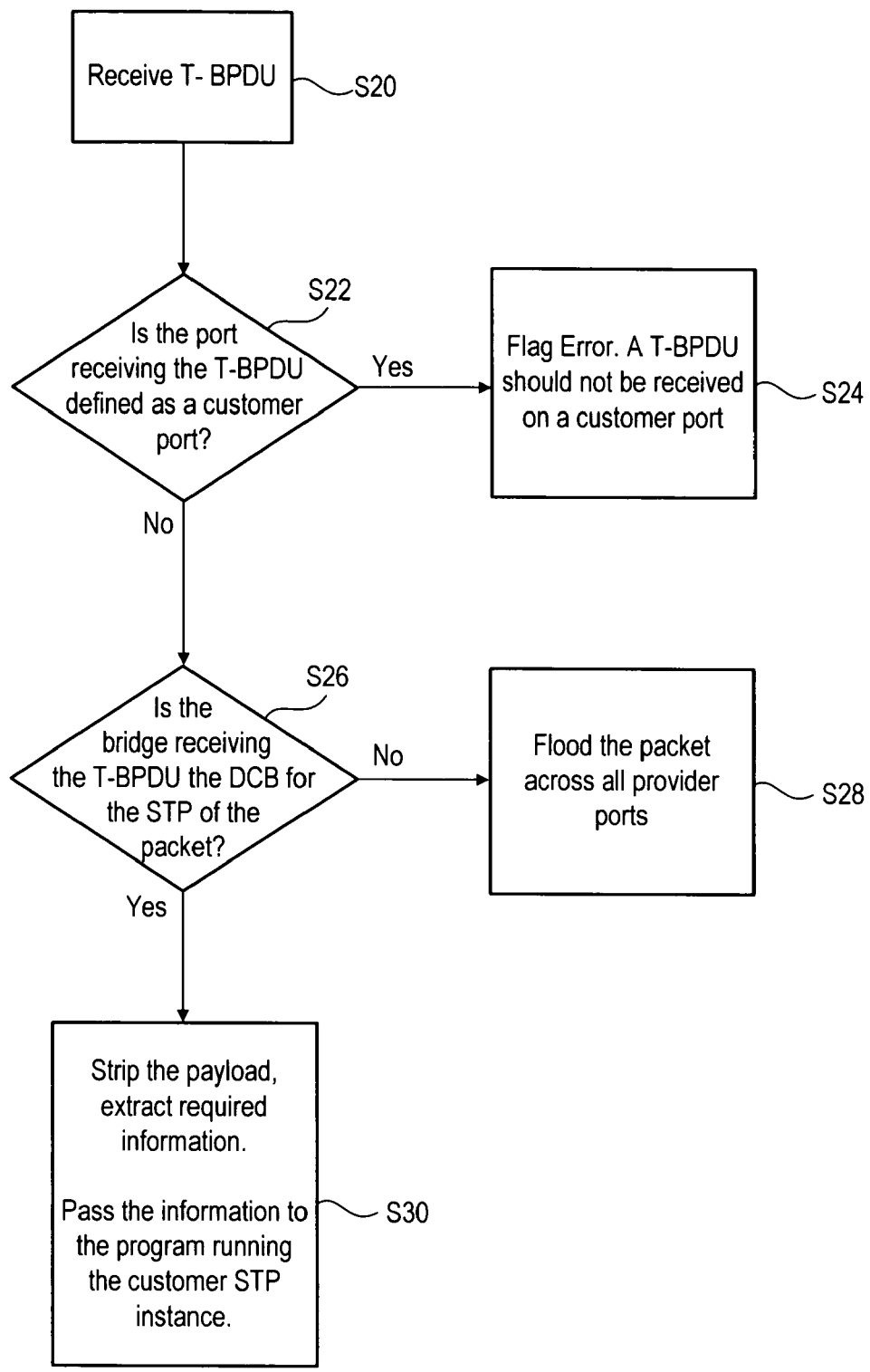
FIG. 11 is a flow chart detailing some of the features of the invention when a T-BPDU in accordance with the invention is received.
Figure 12:
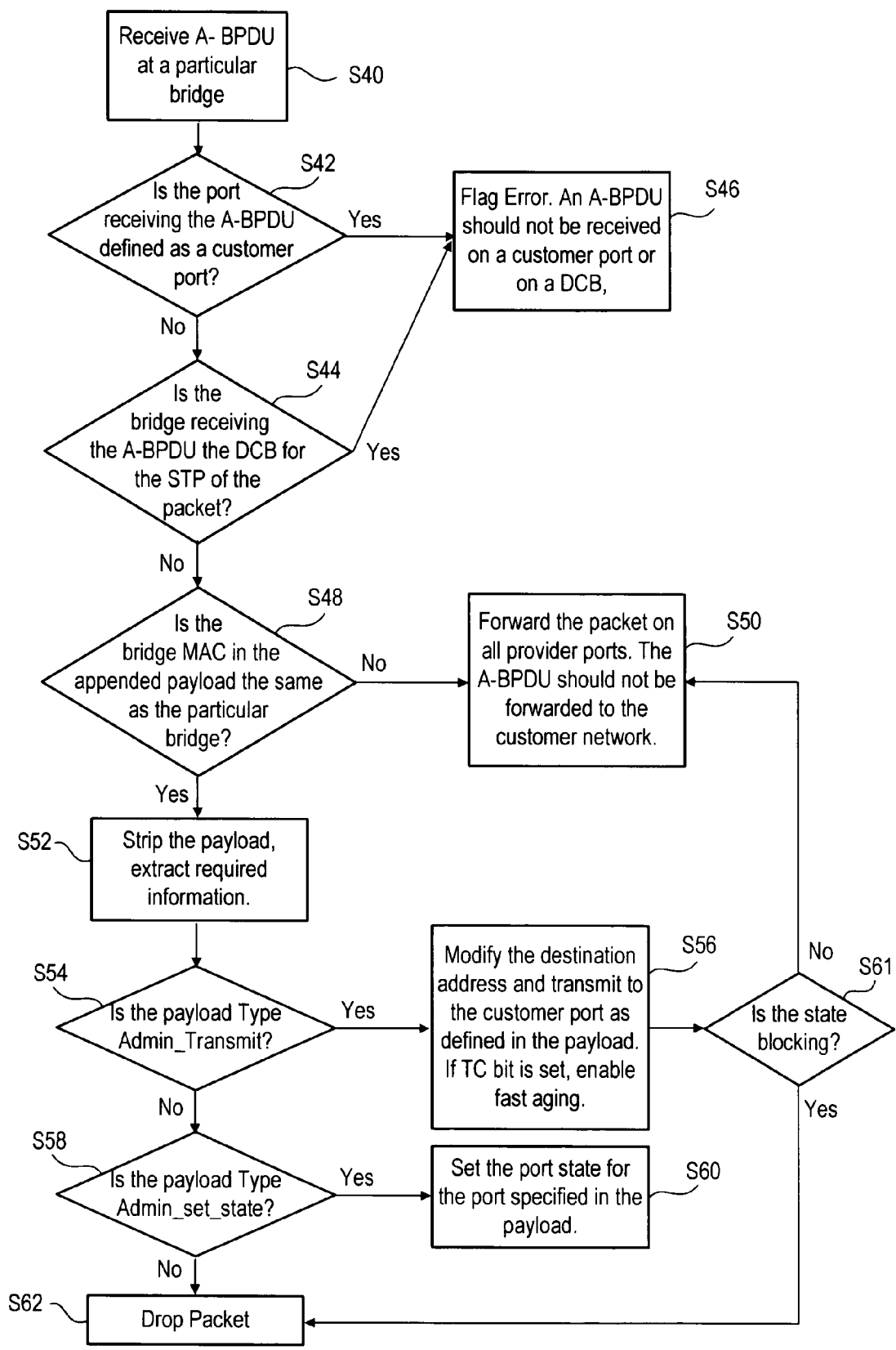
FIG. 12 is a flow chart detailing some of the features of the invention when an A-BPDU in accordance with the invention is received.

The actions of each provider switch 56, 58, 60 which receive any BPDU throughout all of network 50 is summarized in FIGS. 9-12. Referring to FIG. 9, at step S100, a BPDU is received. At step S102, a query is made as to whether the received BPDU is a standard IEEE BPDU or standard protocol packet. If the answer is yes, control branches to step S2 (FIG. 10). If the answer is no, the software branches to step S104 and queries whether the received BPDU is a T-BPDU. If the answer is yes, control branches to step S20 (FIG. 11). If the answer is no, the software branches to step S108 and queries whether the received BPDU is an A-BPDU. If the answer is yes, control branches to step S40 (FIG. 12). If the answer is no, the packet is dropped at step S110 (FIG. 9).

Referring to FIG. 10, at step S2, a standard IEEE BPDU is received. At step S4, a query is made as to whether the port which received the IEEE BPDU is defined as a customer port. If the answer is no, control branches to step S6 where the IEEE BPDU is processed based on the provider network STP instance associated with the non-customer port. If the answer at step S4 is yes, control branches to step S8 where the software queries whether the bridge which received the BPDU is the DCB for the STP associated with the received IEEE BPDU. If the answer is yes, control branches to step S10 and the BPDU is processed based on the customer STP instance associated with the customer port. If the answer to query S8 is no, control branches to step S12. At step S12, the destination address is modified, the T-BPDU payload is appended, and the packet is flood to all provider ports. If the TC bit is set in the packet, fast-aging is also enabled at step S12.

Referring to FIG. 11, at step S20, a T-BPDU is received. At step S22, a query is made as to whether the port which received in the T-BPDU is a customer port. If the answer is yes, control branches to step S24 where a flag error is made as a T-BPDU should not be received on a customer port. If the answer at step S22 is no, control branches to step S26 where the system queries whether the bridge which received the T-BPDU is the DCB for the STP associated with the received T-BPDU. If the answer is no, control branches to step S28 and the packet is flood across all provider ports. If the answer to query S26 is yes, control branches to step S30. At step S30, the payload is stripped, and required information is extracted. The BPDU information is then sent on to the program in the DCB running the particular customer STP instance based on the customer bridge ID and port ID found in the BPDU.

Referring to FIG. 12, at step S40, an A-BPDU is received. At step S42, a query is made as to whether the port which received the A-BPDU is a customer port. If the answer is yes, control branches to step S46 where a flag error is made as an A-BPDU should not be received on a customer port. If the answer at step S42 is no, control branches to step S44 where the software queries whether the bridge which received the A-BPDU is the DCB for the STP instance of the received packet. If the answer is yes, control branches to step S46 where a flag error is made as an A-BPDU should not be received on the DCB. If the answer is no, control branches to step S48 and the system software queries whether the bridge MAC in the appended payload is the same as the particular bridge that received the A-BPDU. Stated another way, is the A-BPDU destined for this particular bridge? If the answer is no, control branches to step S50, and the packet is forwarded on all provider ports but not to the customer network. If the answer to query S48 is yes, control branches to step S52, where the payload is stripped, and required information is extracted.

Control then branches to step S54 where the software queries whether the payload type is Admin_Transmit. If the answer is yes, control branches to step S56 where the destination address is modified, and transmitted to the applicable customer port as defined in the payload. If the TC bit is set, fast aging is enabled. If the answer to step S54 is no, control branches to step S58 where the system queries whether the payload type is Admin_set_state. If the answer is yes, control branches to step S60 where the port state for the port specified in the payload is set. Control the branches to step S61 where the system queries whether the port state is blocking. If the answer is yes, control branches to step S62 and the packet is dropped. If the answer is no, control branches to step S56 discussed above. If the answer to step S58 is no, control branches to step S62 where the received packet is dropped.

If the provider network root changes, the DCB changes and the customer spanning tree network is affected. During this transition period, all customer ports are set to a blocking state.

Figure 13:
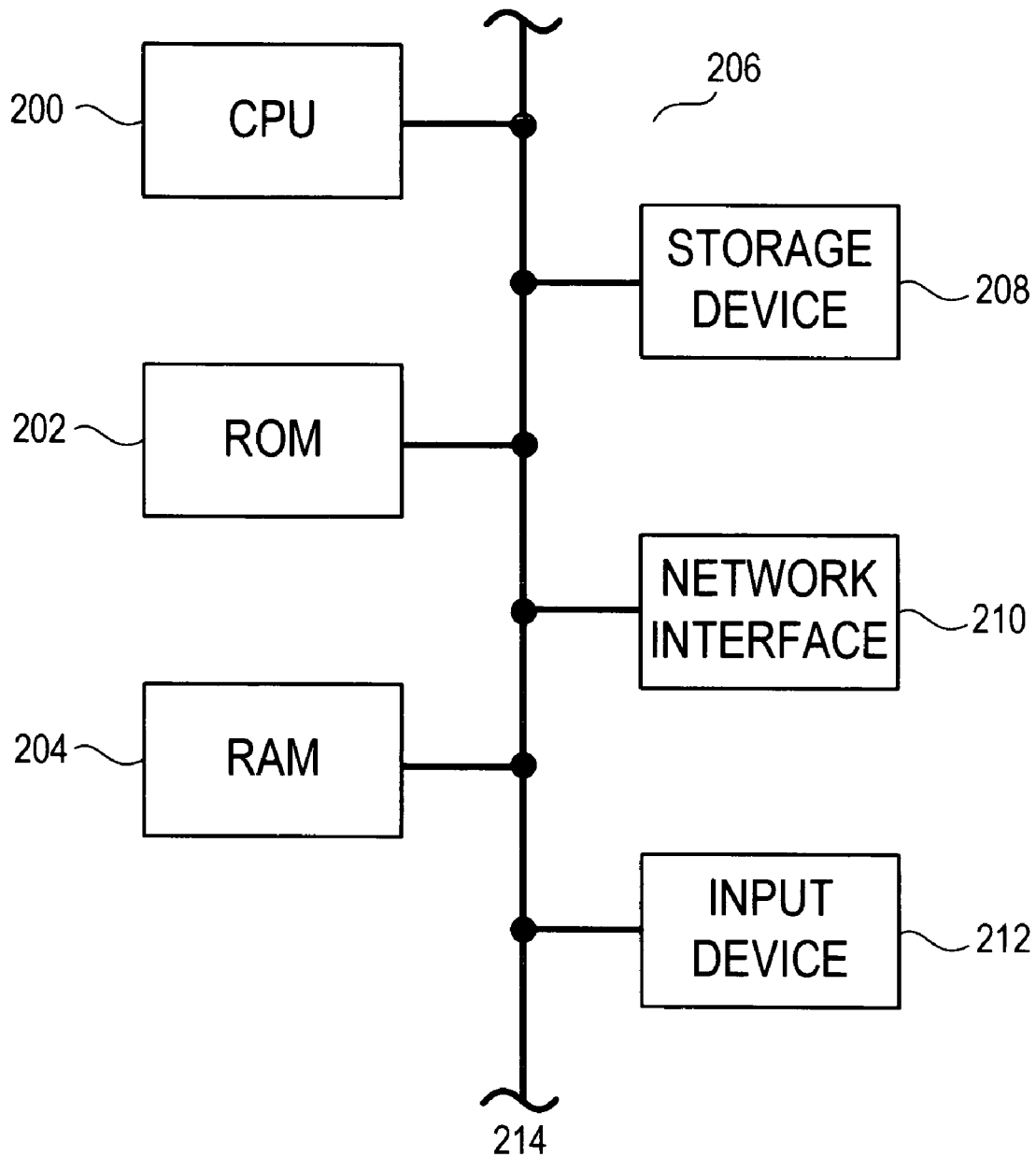
FIG. 13 is a diagram showing the hardware of switches used in accordance with one embodiment of the invention.

Referring to FIG. 13, each switch may comprise a conventional computer 206 including a CPU 200, a read only memory ("ROM") 202, a random access memory ("RAM") 204, a storage device 208, a network interface (such as the ports discussed above) 210 and an input device 212 all coupled together by a bus 214. The program may be stored on computer 206, on storage media 57 or stored remotely.

Thus, by providing a designated customer bridge in a provider network and enabling that switch to run a loop avoidance instance in the customer network, the provider network is protected from loops originating in the customer network caused by a non-enabled loop avoidance protocol.

What is claimed is:

1. A method comprising:
   receiving a loop avoidance protocol packet at a port of a provider network device configured to perform packet switching; and
   if the port is coupled to a customer network:
   if the provider network device is a root bridge for the provider network, processing the loop avoidance protocol packet based on a customer loop avoidance protocol instance associated with the port; and
   if the provider network device is not the root bridge for the provider network, flooding a modified loop avoidance protocol packet to one or more ports of the provider network device that are coupled to the provider network, the modified loop avoidance protocol packet identifying the provider network device and a customer network device that sent the loop avoidance protocol packet.

2. The method of claim 1 wherein the flooding comprises:
   modifying a destination address of the loop avoidance protocol packet to identify the customer network device that sent the loop avoidance protocol packet, the modifying creating the modified loop avoidance protocol packet;

appending to the modified loop avoidance protocol packet information identifying the provider network device; and flooding the modified loop avoidance protocol packet to the one or more ports of the provider network device that are coupled to the provider network.

3. The method of claim 1, further comprising:
if the port is not coupled to the customer network, processing the loop avoidance protocol packet based on a provider loop avoidance protocol instance associated with the port.

4. The method of claim 1 wherein the loop avoidance protocol packet comprises a bridge protocol data unit (BPDU).

5. The method of claim 1 wherein
the provider loop avoidance protocol instance comprises a first spanning tree protocol (STP) instance; and
the customer loop avoidance protocol instance comprises a second STP instance.

6. The method of claim 1 wherein the flooding comprises tunneling the modified loop avoidance protocol packet to the root bridge.

7. The method of claim 2 wherein the appending further comprises appending one or more of:
a payload type;
a port ID corresponding to the port of the provider network device; and
an address of the provider network device.

8. The method of claim 1, further comprising:
if the loop avoidance protocol packet indicates a topology change, enabling fast-aging of learned network device addresses.

9. A method comprising:
receiving a first packet at a first port of a first provider network device configured to perform packet switching, the first packet comprising a loop avoidance protocol packet and identifying a second provider network device that received the loop avoidance protocol packet from a customer network, the first packet identifying a customer network device that sent the loop avoidance protocol packet;
if the first provider network device is not a root bridge for the provider network, flooding the first packet to one or more ports of the provider network device that are coupled to the provider network; and
if the first provider network device is the root bridge for the provider network, processing the loop avoidance protocol packet based on a customer loop avoidance protocol instance associated with a second port of the second provider network device that received the loop avoidance protocol packet from the customer network.

10. The method of claim 9, further comprising indicating an error if the first port is coupled to the customer network.

11. The method of claim 9 wherein the loop avoidance protocol packet comprises a bridge protocol data unit (BPDU).

12. The method of claim 9 wherein the customer loop avoidance protocol instance comprises a spanning tree protocol (STP) instance.

13. The method of claim 9 wherein the flooding comprises tunneling the first loop avoidance protocol packet to the root bridge.

14. The method of claim 9 wherein the loop avoidance protocol packet comprises:

a destination address identifying a customer network device; and
a payload portion comprising information identifying the second provider network device that received the loop avoidance protocol packet from the customer network, the information comprising:
a payload type;
a port ID corresponding to the second port; and
an address of the second provider network device.

15. An apparatus comprising:
a memory; and
a module configured to:
receive a loop avoidance protocol packet at a port of the apparatus, the apparatus configured to perform packet switching and coupled to a provider network; and
if the port is coupled to a customer network:
if the apparatus is a root bridge for the provider network, process the loop avoidance protocol packet based on a customer loop avoidance protocol instance associated with the port; and
if the apparatus is not the root bridge for the provider network, flood a modified loop avoidance protocol packet to one or more ports of the apparatus that are coupled to the provider network, the modified loop avoidance protocol packet identifying the apparatus and a customer network device that sent the loop avoidance protocol packet.

16. The apparatus of claim 15 wherein the module is further configured to flood the modified loop avoidance protocol packet by:
modifying a destination address of the loop avoidance protocol packet to identify the customer network device that sent the loop avoidance protocol packet, the modifying creating the modified loop avoidance protocol packet;
appending to the modified loop avoidance protocol packet information identifying the apparatus; and
flooding the modified loop avoidance protocol packet to the one or more ports of the apparatus that are coupled to the provider network.

17. The apparatus of claim 15 wherein the module is further configured to:
if the port is not coupled to the customer network, process the loop avoidance protocol packet based on a provider loop avoidance protocol instance associated with the port.

18. The apparatus of claim 15 wherein the loop avoidance protocol packet comprises a bridge protocol data unit (BPDU).

19. The apparatus of claim 15 wherein
the provider loop avoidance protocol instance comprises a first spanning tree protocol (STP) instance; and
the customer loop avoidance protocol instance comprises a second STP instance.

20. The apparatus of claim 15 wherein the module is further configured to flood the modified loop avoidance protocol packet by tunneling the modified loop avoidance protocol packet to the root bridge.

21. The apparatus of claim 16 wherein the appending further comprises appending one or more of:
a payload type;
a port ID corresponding to the port of the apparatus; and
an address of the apparatus.

22. The apparatus of claim 15 wherein the module is further configured to:
if the loop avoidance protocol packet indicates a topology change, enable fast-aging of learned network device addresses.

23. An apparatus comprising:
a memory; and
a module configured to:
  receive a first packet at a first port of the apparatus, apparatus configured to perform packet switching and coupled to a provider network, the first packet comprising a loop avoidance protocol packet and identifying a second provider network device that received the loop avoidance protocol packet from a customer network, the first packet identifying a customer network device that sent the loop avoidance protocol packet;
  if the apparatus is not a root bridge for the provider network, flood the first packet to one or more ports of the apparatus that are coupled to the provider network; and
  if the apparatus is the root bridge for the provider network, process the loop avoidance protocol packet based on a customer loop avoidance protocol instance associated with a second port of the second provider network device that received the loop avoidance protocol packet from the customer network.

24. The apparatus of claim 23 wherein the module is further configured to indicate an error if the first port is coupled to the customer network.

25. The apparatus of claim 23 wherein the loop avoidance protocol packet comprises a bridge protocol data unit (BPDU).

26. The apparatus of claim 23 wherein the customer loop avoidance protocol instance comprises a spanning tree protocol (STP) instance.

27. The apparatus of claim 23 wherein the module is configured to flood the first packet to one or more ports of the apparatus that are coupled to the provider network by tunneling the first loop avoidance protocol packet to the root bridge.

28. The apparatus of claim 23 wherein the loop avoidance protocol packet comprises: a destination address identifying a customer network device; and
  a payload portion comprising information identifying the second provider network device that received the loop avoidance protocol packet from the customer network, the information comprising:
    a payload type;
    a port ID corresponding to the second port; and
    an address of the second provider network device.

29. An apparatus comprising:
means for receiving a loop avoidance protocol packet at a port of a provider network device configured to perform packet switching; and
means for, if the port is coupled to a customer network:
  if the provider network device is a root bridge for the provider network, processing the loop avoidance protocol packet based on a customer loop avoidance protocol instance associated with the port; and
  if the provider network device is not the root bridge for the provider network, flooding a modified loop avoidance protocol packet to one or more ports of the provider network device that are coupled to the provider network, the modified loop avoidance protocol packet identifying the provider network device and a customer network device that sent the loop avoidance protocol packet.

30. An apparatus comprising:
means for receiving a first packet at a first port of a first provider network device configured to perform packet switching, the first packet comprising a loop avoidance protocol packet and identifying a second provider network device that received the loop avoidance protocol packet from a customer network, the first packet identifying a customer network device that sent the loop avoidance protocol packet;
means for, if the first provider network device is not a root bridge for the provider network, flooding the first packet to one or more ports of the provider network device that are coupled to the provider network; and
means for, if the first provider network device is the root bridge for the provider network, processing the loop avoidance protocol packet based on a customer loop avoidance protocol instance associated with a second port of the second provider network device that received the loop avoidance protocol packet from the customer network.

31. A computer-readable medium embodying a program of instructions executable by a computer to perform a method, the method comprising:
receiving a loop avoidance protocol packet at a port of a provider network device configured to perform packet switching; and
if the port is coupled to a customer network:
  if the provider network device is a root bridge for the provider network, processing the loop avoidance protocol packet based on a customer loop avoidance protocol instance associated with the port; and
  if the provider network device is not the root bridge for the provider network, flooding a modified loop avoidance protocol packet to one or more ports of the provider network device that are coupled to the provider network, the modified loop avoidance protocol packet identifying the provider network device and a customer network device that sent the loop avoidance protocol packet.

32. A computer-readable medium embodying a program of instructions executable by a computer to perform a method, the method comprising:
receiving a first packet at a first port of a first provider network device configured to perform packet switching, the first packet comprising a loop avoidance protocol packet and identifying a second provider network device that received the loop avoidance protocol packet from a customer network, the first packet identifying a customer network device that sent the loop avoidance protocol packet;
if the first provider network device is not a root bridge for the provider network, flooding the first packet to one or more ports of the provider network device that are coupled to the provider network; and
if the first provider network device is the root bridge for the provider network, processing the loop avoidance protocol packet based on a customer loop avoidance protocol instance associated with a second port of the second provider network device that received the loop avoidance protocol packet from the customer network.

* * * * *